June 19, 1945.  G. HILLER  2,378,707
WELDING ROD HOLDER
Filed Aug. 26, 1943
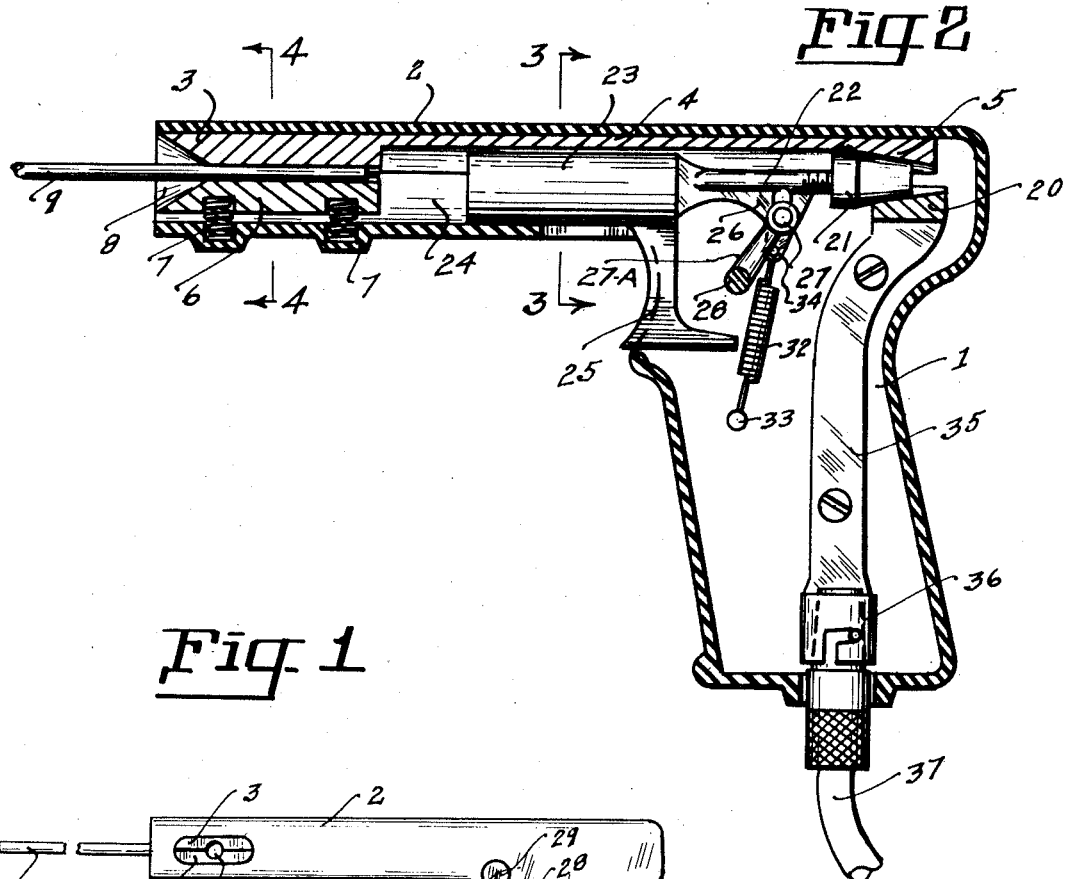
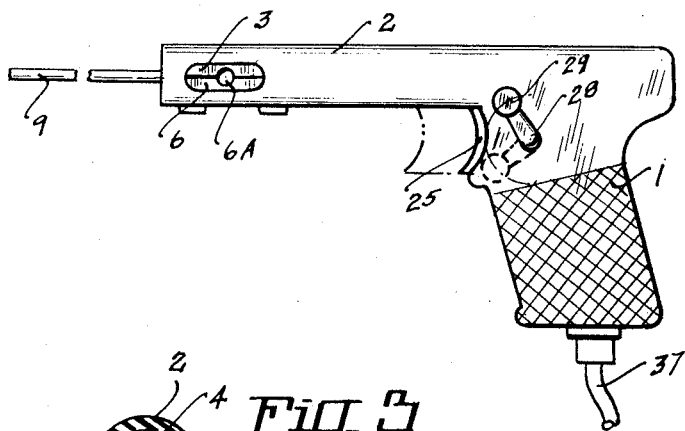
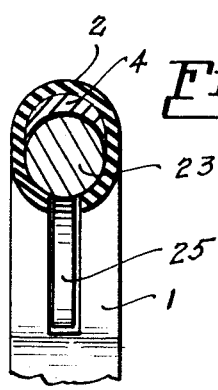
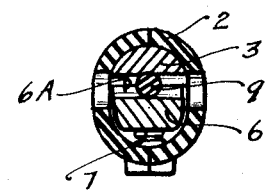
GUSTAVE HILLER
INVENTOR
BY *[signature]*
ATTORNEY Patented June 19, 1945

2,378,707

UNITED STATES PATENT OFFICE 2,378,707

WELDING ROD HOLDER

Gustave Hiller, Vancouver, Wash.

Application August 26, 1943, Serial No. 500,131

3 Claims. (Cl. 200—157)

This invention relates to welding rod holders and the primary object is to provide a rod holder having a switch mechanism therein that will be held positively in either open or closed position automatically.

Another object of my invention is the provision of a welding rod holder shaped or formed to give a natural grip while being held by the welder.

My new and improved welding rod holder prevents flashes, because when the rod is removed from the work the electric supply can be definitely disengaged within the holder by a switch and this switch will be held open until closed deliberately by the welder.

These and other incidental objects will be apparent in the drawing, specification and claims.

Referring to the drawing:

Figure 1 is a side elevation of my new and improved welding rod holder.

Figure 2 is a sectional side elevation of my new and improved rod holder.

Figure 3 is a sectional view, taken on line 3—3 of Figure 2, illustrating the switch mechanism therein.

Figure 4 is a sectional view, taken on line 4—4 of Figure 2, illustrating the rod holding clamp.

In the drawing:

1 indicates the body of my new and improved rod holder, that portion of the body that is gripped by the operator. 2 is an extension of the body housing the rod holding clamp 3. The handle 1 and the extension of the handle 2 is made from an insulating material. The clamp member 3 extends through the body 2, as indicated at 4 and terminates in a switch bar portion 5 in the rear of the holder.

A movable clamp 6 is held against the clamp 3 by suitable tension members, as springs 7. Both clamps are made in halves and are cored out longitudinally for holding the rod 9. Their outer ends are tapered as at 8 for facilitating the placing of the rod therein. The clamps are also cross cored as at 6A so that the rod may be put in from the side of the body 2, which is desirable under certain working conditions.

Slidably mounted within the body 2 is a guide element 23 loosely fitting within the inner body of the holder at 24. Extending downwardly from the element 23 is a trigger bar 25. Extending rearwardly from the guide element 23 is an extension arm 22, having a suitable switch bar 21 made of the proper switch material for engaging the rear of the clamp bar 3 at 5 and the switch bar 35 at 20 supplying electrical energy. This closes an electric circuit through the switch bar 35 and the switch bar 5 through the portion 4 of the clamp 3 to the rod 9. A suitable bayonet connection 36 is provided so that the electric supply wire 37 can be removed and the holder carried in the pocket of the welder.

A shaft 28 is mounted in the body carrying a toggle bar 27A within the body which engages in a slot in a portion 26 of the guide element extension 22 so that in the rotary reciprocatory movement of the shaft the guide element 23 may be operated. The shaft extends outwardly of the body and is provided with a lateral arm terminating in an operating head 29 so that the shaft 28 may be operated from the exterior of the body.

When the trigger 25 is pulled toward the holder by the operator the upper end 27 of a toggle bar 27A is rotated about its center shaft 28 moving an operating lever 29 on the outside of the holder to the position shown in Figure 1. As this movement takes place the toggle spring 32, having one of its ends anchored at 33 and its opposite end anchored to the clamp at 34, which is pivotally mounted to the upper end of the toggle arm at 27, passes over its center line as illustrated in Figure 2, thereby holding the switch bar in closed position. When it is desired to throw the switch in open position the arm 29 is forced down to the dotted position by the operator, rocking the toggle arm 27A forward until the spring 32 passes its center line at which time it will force the toggle arm forward holding the switch in open position. This is an important feature of my invention, as it prevents accidental contacts and flashes which heretofore has been very dangerous. In my new and improved rod holder, the current is either off or on and can be determined by observing the safety or operating lever 29.

I do not wish to be limited to the exact construction as illustrated, as other forms of mechanical improvement may be used, still coming within the scope of my claims.

What I claim is:

1. An energizing control for welding rod holders of the type having a body of pistol form with a two-member electrode holder at one end of the barrel with one of the members extending lengthwise the barrel and into the handle, said energizing control including a guide slidable in the barrel, a switch plug carried by and movable with the guide, spaced circuit contacts to be bridged by the switch plug when the slide is moved in one direction, one of said contacts being carried by the handle end of the electrode member and the other carried in the handle, a biasing spring connected to the guide, and two independent mechanically operable means each of which may be operated at will for moving the guide and thereby the switch plug to a position to be held by the biasing spring to complete a circuit through said contacts, one only of such independently operable means being capable of moving the guide and switch plug to break the circuit.

2. A construction as defined in claim 15, wherein the mechanically-operable means alone is adapted to break the contact serving as a visible indicator of the condition of the energizing of the welding rod holder.

3. A construction as defined in claim 1, wherein one of said mechanically-operable means depends directly from the guide and is mounted to represent a trigger of the pistol form to be operable by a finger of the hand grasping the handle of the holder.

GUSTAVE HILLER.